(12) United States Patent
Chen et al.

(10) Patent No.: US 11,811,734 B2
(45) Date of Patent: Nov. 7, 2023

(54) PROTOCOL SWITCHING FOR CONNECTIONS TO ZERO-TRUST PROXY

(71) Applicant: Prosimo Inc, Santa Clara, CA (US)

(72) Inventors: Howard Chen, Milpitas, CA (US); Arunabha Saha, Fremont, CA (US); Prashanth Prabhu, Mountain View, CA (US)

(73) Assignee: Prosimo Inc, Santa Clara, CA (US)

( * ) Notice: Subject to any disclaimer, the term of this patent is extended or adjusted under 35 U.S.C. 154(b) by 133 days.

(21) Appl. No.: 17/350,890

(22) Filed: Jun. 17, 2021

(65) Prior Publication Data

US 2022/0407840 A1 Dec. 22, 2022

(51) Int. Cl.
*G06F 21/00* (2013.01)
*H04L 9/40* (2022.01)
*H04L 69/22* (2022.01)
*H04L 69/165* (2022.01)

(52) U.S. Cl.
CPC ...... *H04L 63/0236* (2013.01); *H04L 63/0263* (2013.01); *H04L 63/0281* (2013.01); *H04L 63/101* (2013.01); *H04L 63/108* (2013.01); *H04L 69/165* (2013.01); *H04L 69/22* (2013.01)

(58) Field of Classification Search
CPC ............. H04L 63/0236; H04L 63/0263; H04L 63/0281; H04L 63/101; H04L 63/108; H04L 69/165; H04L 69/22
See application file for complete search history.

(56) References Cited

U.S. PATENT DOCUMENTS

| | | | | |
|---|---|---|---|---|
| 2004/0193906 A1* | 9/2004 | Dar | ............ | H04L 9/40 726/13 |
| 2005/0074004 A1* | 4/2005 | Wu | ...... | H04L 61/2564 709/245 |
| 2011/0242594 A1* | 10/2011 | Yabe | ...... | G06F 3/1271 358/1.15 |
| 2014/0006481 A1* | 1/2014 | Frey | ......... | H04L 69/22 709/203 |
| 2014/0059168 A1* | 2/2014 | Ponec | ...... | H04L 67/02 709/217 |
| 2015/0244835 A1* | 8/2015 | Fausak | ..... | H04L 67/04 709/203 |
| 2022/0028160 A1* | 1/2022 | Patel | ....... | G06T 15/06 |
| 2022/0109663 A1* | 4/2022 | Swain | ...... | H04L 63/08 |

FOREIGN PATENT DOCUMENTS

| | | | | |
|---|---|---|---|---|
| CN | 106534243 A | * | 3/2017 | ............. H04L 29/08 |
| CN | 112968839 B | * | 2/2022 | ............. H04L 45/22 |
| WO | WO-2020177511 A1 | * | 9/2020 | .......... H04L 61/1511 |

* cited by examiner

*Primary Examiner* — Michael M Lee
(74) *Attorney, Agent, or Firm* — David R. Stevens; Stevens Law Group

(57) ABSTRACT

An HTTP connection between a client computing device and an application is established through a reverse proxy. A response to the client computing device includes a payload instructing initiation of a non-HTTP connection (e.g., TCP, UDP). The response is modified to replace references to an original port with a dynamic port allocated to the non-HTTP connection and a temporary ACL entry is created. A subsequent connection request addressed to the dynamic port is authorized per the ACL, modified to replace the dynamic port with the original port, and forwarded to the application. Subsequent packets for the non-HTTP connection have port numbers translated between the original and dynamic ports.

18 Claims, 5 Drawing Sheets

PROTOCOL SWITCHING FOR CONNECTIONS TO ZERO-TRUST PROXY

FIELD OF THE INVENTION

The present invention relates generally to systems and methods for implementing secure connections to applications hosted on a cloud computing platform.

BACKGROUND OF THE INVENTION

Many server-side applications will interact with users using HTTP as the transport application. However, many such applications continue to use TCP connections for most communication. In such an application, an HTTP portal is used to redirect or trigger the TCP-based components of the application. In many such applications, the payload data transported over the TCP connection may be encrypted or formatted in an unintelligible proprietary format.

The systems and methods disclosed herein provide an improved approach for managing execution of such applications.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1B:
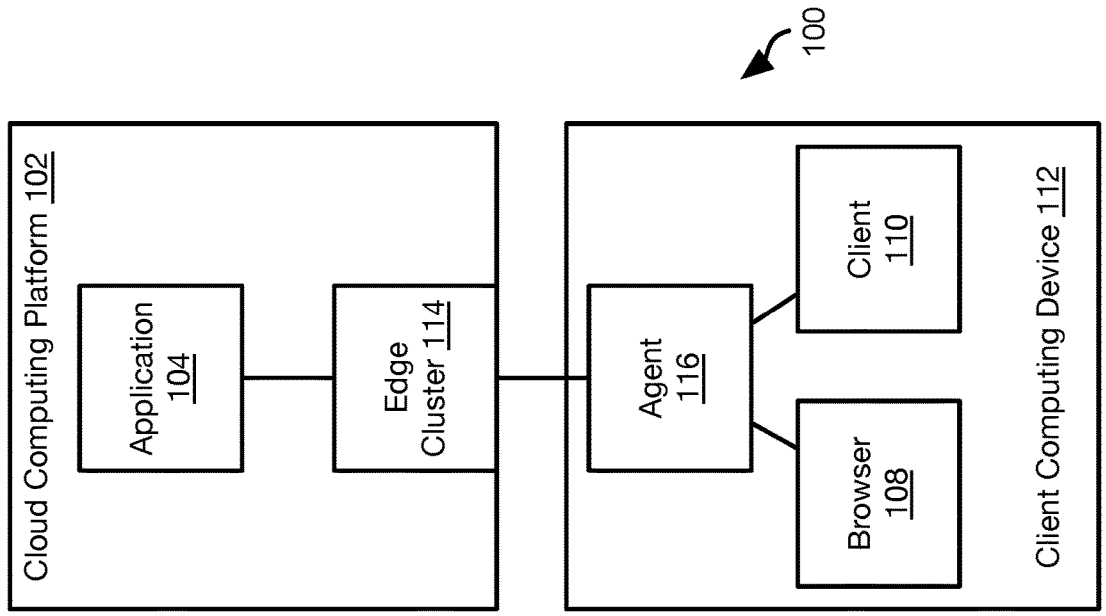
FIGS. 1A and 1B are schematic block diagram of a network environment for managing access to cloud-based applications in accordance with an embodiment of the present invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 1A:
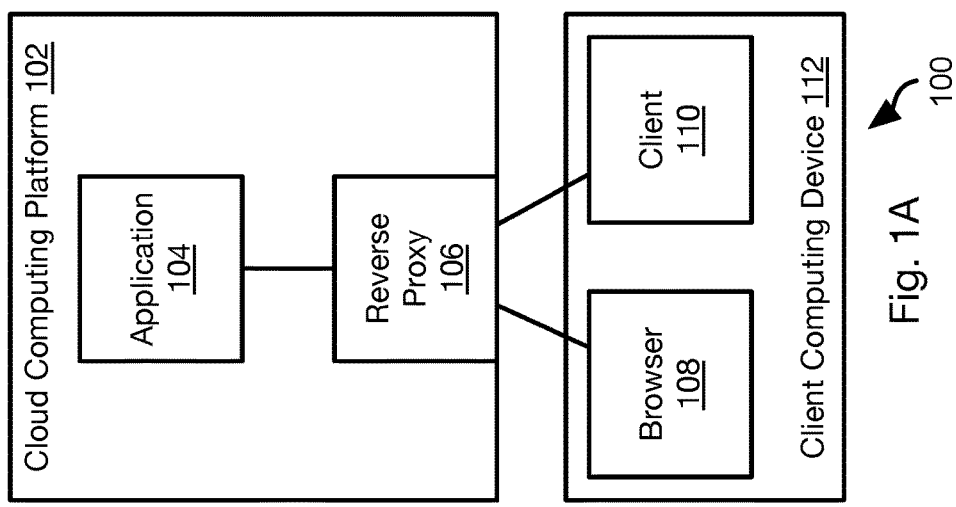

Referring to FIG. 1A, a network environment 100 may include one or more cloud computing platforms 102, such as AMAZON WEB SERVICES (AWS), MICROSOFT AZURE, GOOGLE CLOUD PLATFORM, or the like. As known in the art, a cloud computing platform 102 may be embodied as a set of computing devices coupled to networking hardware and providing virtualized computing and storage resources such that a user may instantiate and execute applications, implement virtual networks, and allocate and access storage without awareness of the underling computing devices and network hardware. The cloud computing platform 102 may have some or all of the attributes of the cloud computing model described above.

The cloud computing platform 102 may execute an application 104. The application 104 may be a hybrid application with respect to protocols used. For example, as described above, the application 104 may define a hypertext transfer protocol (HTTP) portal by which users access the application 104. Messages exchanged by way of the HTTP portal may invoke establishment of a non-HTTP connection. The examples below are described with respect to HTTP protocol and TCP protocol as the non-HTTP protocol. In other embodiments, user datagram protocol (UDP) may be used as the non-HTTP protocol in place of TCP in the examples below. Transfers between any two protocols may be performed in a similar manner. The non-HTTP protocol may include any layer 7 protocol that can be implemented over user datagram protocol (UDP) or TCP. Such protocols may include simple mail transfer protocol (SMTP), trivial file transfer protocol (TFTP), network file service (NFS) protocol, secure shell (SSH), common Internet file system (CIFS), messaging application programming interface (MAPI), or other network protocol. Non-standard and proprietary protocols (e.g., unpublished) may also be used. Customized versions of any of the above-referenced protocols may also be used.

Access to the application 104 may be controlled by a reverse proxy 106 such that all connection requests and traffic addressed to the application must pass through the reverse proxy 106. The reverse proxy 106 may be a reverse proxy according to any approach known in the art and may implement a zero trust protocol in which all attempts to access the application 104 must first be authenticated. The reverse proxy 106 may perform authentication using an authentication service, such as an identity provider (IDP). For example, OKTOA, single sign on (SSO), or other authentication service may be used to verify the identity of a user attempting to access the application 104 through the reverse proxy 106. The reverse proxy may be part of an edge cluster according to the approach described in the applications listed in Table 1, which are hereby incorporated herein by reference in their entirety.

TABLE 1

Incorporated Applications

| Filing Date | application Ser. No. | Title |
|---|---|---|
| Dec. 18, 2020 | 17/127,876 | Managing Application Access Controls And Routing In Cloud Computing Platforms |

TABLE 1-continued

Incorporated Applications

| Filing Date | application Ser. No. | Title |
|---|---|---|
| May 7, 2021 | 17/315,167 | Dynamic Expansion And Contraction Of Edge Clusters For Managing Access To Cloud-Based Applications |
| May 7, 2021 | 17/315,175 | Estimation Of Latency Across Regional Clouds |
| May 7, 2021 | 17/315,181 | Estimating Speedtest Server Accuracy |
| May 7, 2021 | 17/315,192 | Managing Access To Cloud-Hosted Applications Using Domain Name Resolution |

The reverse proxy 106 may receive traffic from a client computing device 112. The client computing device 112 may be a laptop or desktop computer, tablet computer, mobile phone, wearable computing device, or any other type of computing device. The client computing device 112 may execute one or both of a browser 108 and a client 110. The client 110 may be a custom application programmed to interface with the application 104. In some embodiments, a user may launch an application-level session with the application 104 by accessing the HTTP portal using the browser 108. Messages from the application 104 to the browser 108 may invoke launching of the client 110 and continuation of the application-level session (or a new application-level session) between the client 110 and the application 104. As known in the art, the connection between the client 110 and the application 104 may be a TCP connection with one or more additional protocols being implemented within the TCP connection, including proprietary protocols that may be specific to the application 104. In some instances, transfers to a different protocol, such as from HTTP to TCP, may be performed while using just a browser 108 or just a client 110.

Referring to FIG. 1B, in some implementations, the reverse proxy 106 is omitted. The cloud computing platform 102 may execute an edge cluster 114 or other gatekeeper that controls access to the application 104 as described above, i.e. by forwarding traffic to the application 104 only for authenticated users. In such implementations, managing of connections (e.g., transfers from HTTP to TCP) may be managed by an agent 116 executing on the client 116. The functions ascribed to the reverse proxy 106 may therefore be implemented by the edge cluster 114, agent 116, or a combination of the two.

Methods described herein for transfers between protocols may be implemented using the configuration of FIG. 1A or 1B and may be implemented by the reverse proxy 106 alone or by a combination of the agent 116 and an edge cluster 114. In the following description, the reverse proxy 106 alone is referenced with the understanding that the agent 116 and edge cluster 114 may also be used to perform the same functions.

Figure 2A:
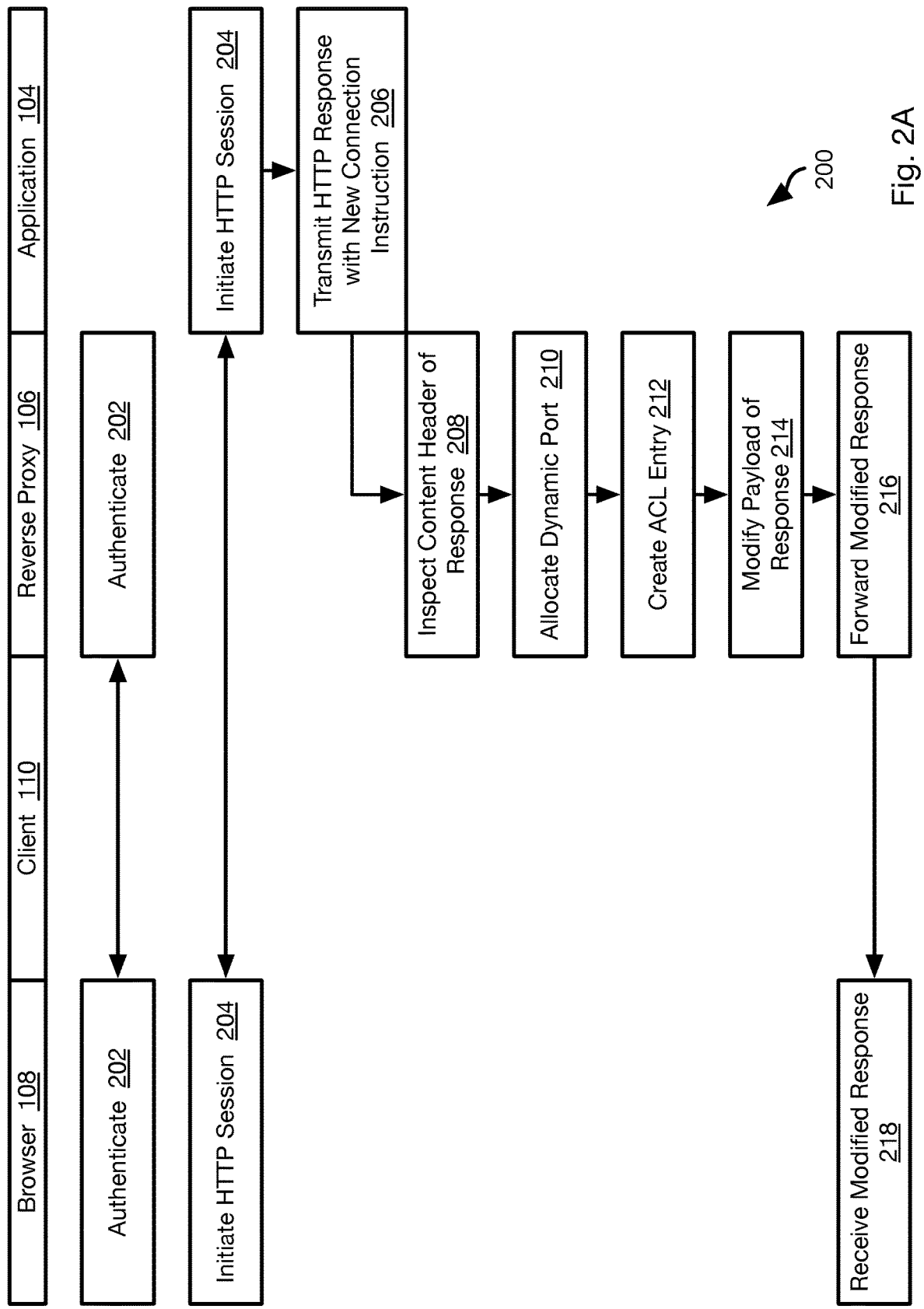
FIGS. 2A, 2B, and 2C are process flow diagrams of a method for in accordance with an embodiment of the present invention.
Figure 2B:
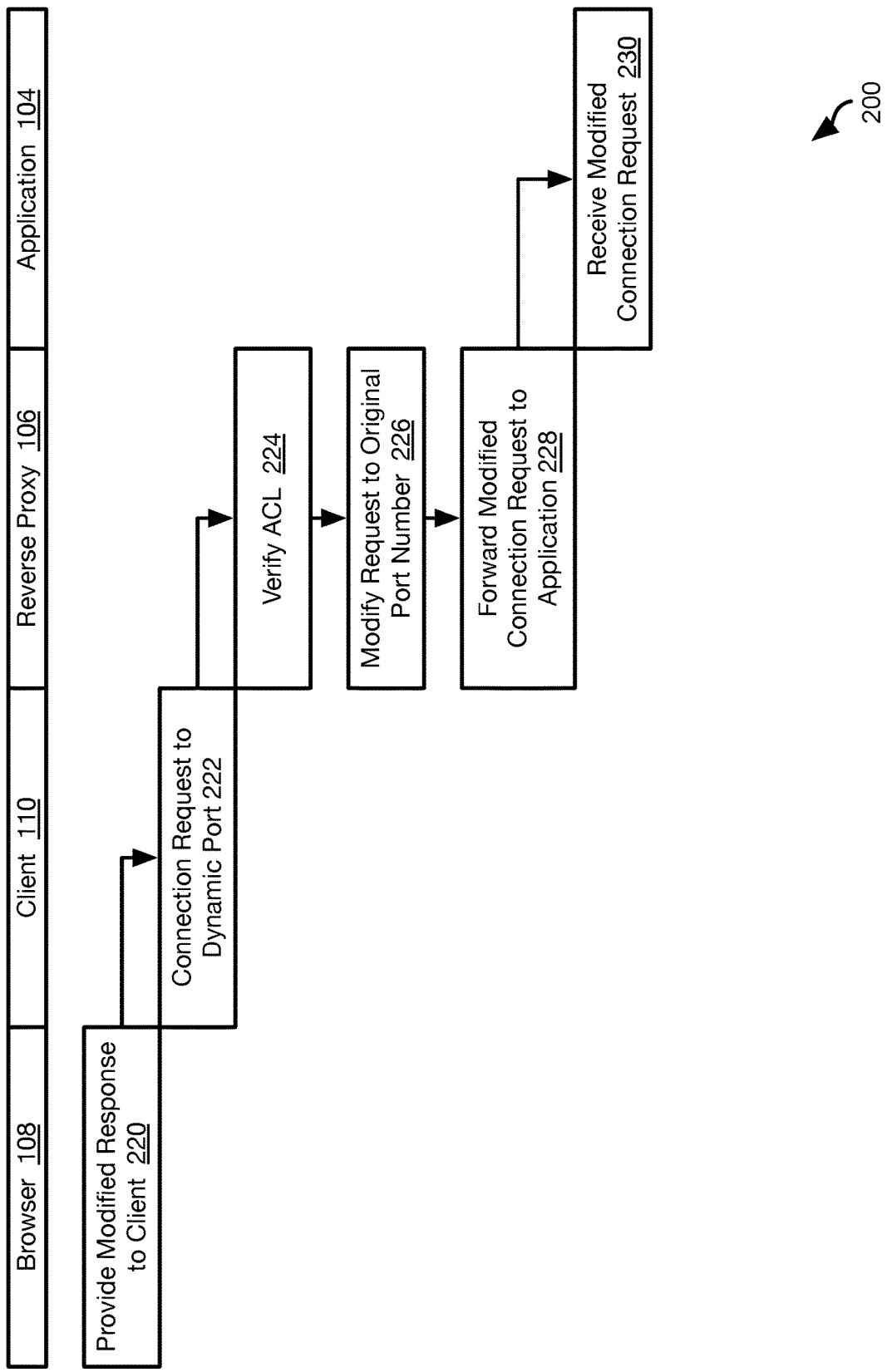
Figure 2C:
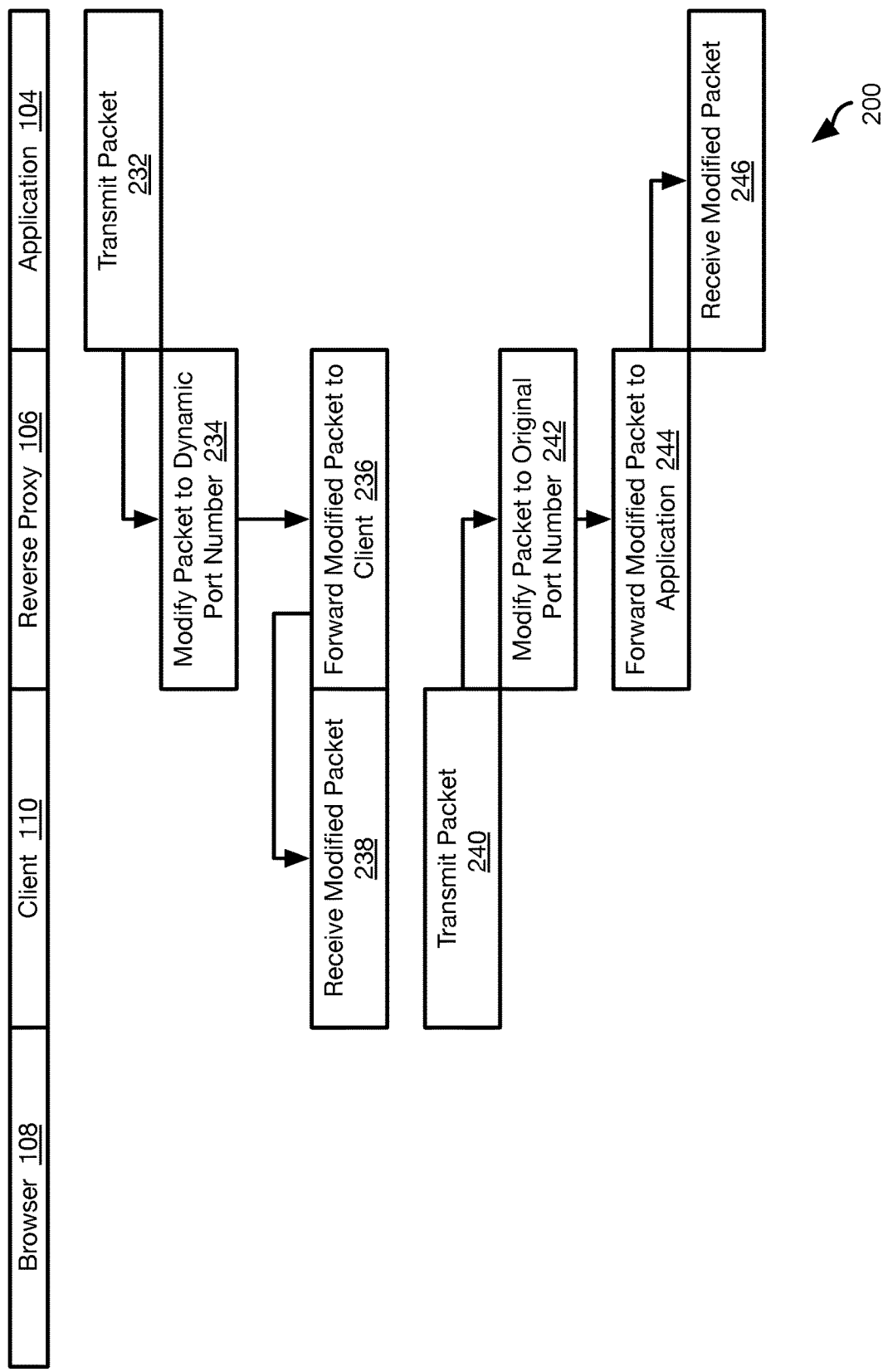

FIGS. 2A, 2B, and 2C illustrate a method 200 for managing transfers between protocols in an efficient manner when an authenticating reverse proxy 106 is used. The method 200 may enable the user of a reverse proxy 106 to efficiently handle transfers between protocols without requiring re-authentication of a user. For example, supposing a user authenticates and initiates an HTTP session. Subsequently, the application 104 invokes initiation of a connection according to TCP and possibly one or more other network protocol implemented on top of TCP, such as secure socket layer (SSL) or a proprietary protocol. Using this approach, the user is not required to again authenticate when initiating the new connection, thereby avoiding delays and making the protocol transfer transparent to the application 104.

The method 200 enables a proxy 106 to enable transfers between protocols, even when the proxy 106 is not enabled to parse information from packets according to those protocols. The method 200 enables the reverse proxy 106 to perform these functions in a way that is transparent to the application 104 and the browser 108 and/or client 110 accessing the application 104.

The method 200 is described below with respect to a browser 108 and a client 110 such that a protocol transfer is accompanied by a transfer of interactions with the application 104 from the browser 108 to the client 110. It shall be understood that the method 200 may be used to implement a protocol transfer without a corresponding transfer between the browser 108 and the client 110.

The method 200 may include authenticating 202 the browser 108 with respect to the reverse proxy 202. The authentication 202 may be performed according to any approach known in the art and may include passing a user name and password, credential, or other authentication information to the reverse proxy 202. As noted above, authentication 202 may include using a third party authentication service. In response to successful authentication 202, the reverse proxy 202 may grant access by creating an entry in an access control list (ACL) that references attributes of the browser 108, such as internet protocol (IP) address, port number, protocol (e.g., HTTP), or other information that enables subsequent packets from the browser 108 to be identified as being received within an authenticated connection.

The method 200 may further include initiating 204 an HTTP connection between the browser 108 and the application 104 through the reverse proxy 106. The manner in which the connection is initiated 204 and the forwarding of packets by the reverse proxy 106 during initiating 204 may be according to any approach known in the art for using a reverser proxy 106.

At some point during the life of the HTTP connection, the application 104 may transmit 206 an HTTP response that includes an instruction to initiate a new connection to the application 104 according to a different protocol. The HTTP response may be in the form of an HTTP payload including one or more, typically multiple, packets. In some implementations, this instruction is communicated by writing a particular value in the Content-Type field of the header of the HTTP response. In addition, the packets within the HTTP payload may include additional information informing the browser how to establish the new connection (e.g., protocol, port number, IP address, etc.).

In a conventional approach, absent specific (i.e., costly) programming, the reverse proxy 106 is unable to interpret this response. Accordingly, when a connection request is received from the client computing device 112 according to the different protocol, the connection request will be rejected because it does not conform to the HTTP standard and will fail a protocol header check at the reverse proxy 106.

In the method 200, the reverse proxy 106 inspects 208 packets received from the application 104. Inspection may include evaluating the Content-Type field. The reverse proxy 106 may be provided with a signature database. The database may include, for each value of a plurality of values, a rewrite rule for that value. Each value of the plurality of values may be a value that may be included in the Content-Type field. The plurality of values may be obtained by a provider of the signature database by evaluating traffic from a plurality of applications 104 from a plurality of providers. For example, by observing a packet sent by an application prior to a protocol transfer, one can determine what value of the Content-Type field is used by that application to invoke a protocol transfer.

When the value in the Content-Type field of a response inspected at step 208 is not found to match an entry in the signature database, the response may simply be forwarded to the browser 108 within the HTTP connection from step 204.

If the inspection of step 208 results in detection of a value in the Content-Type field matching an entry in the signature database, steps 210-216 may be invoked to handle the protocol transfer.

At step 210, the reverse proxy 106 allocates 110 a dynamic port 210 of the cloud computing platform 102. The reverse proxy 106 further creates 212 an ACL entry referencing the dynamic port 210 and attributes of the client device 112 (e.g., IP address) such that subsequent packets requests addressed to the dynamic port and having the attributes in the ACL entry will be forwarded to the application 104 to which the subsequent packets are addressed. The ACL entry at step 212 may be temporary since opening a port may compromise system security and provide opportunities for a denial of service attack. Accordingly, the ACL entry may be limited to a specific IP address and be removed after a limited time (e.g., have a time to live (TTL) set to a small value). For example, the TTL for the ACL entry created at step 212 may be smaller and expire before the TTL of an ACL created in response to authentication at step 202. The short TTL is acceptable inasmuch as the protocol transfer should happen immediately after the ACL is created and the ACL is not needed once the connection is established.

The reverse proxy 106 may further modify 214 the response to obtain a modified response (e.g., modified payload). The modification 214 may include allocating an unused dynamic port and adding a reference to the dynamic port to the packet. For example, supposing the value of the Content-Type field of the packet instructs transfer to TCP protocol. The packet may likewise specify which port to use for the new TCP connection. The port to use may be included in the header of the response or in headers of packets included in the response embodied as an HTTP payload. Accordingly, the rewrite rule for the value of the Content-Type field may indicate which bits of the headers of the HTTP payload and/or packets of the HTTP payload to overwrite with the port number of the dynamic port. The modification 214 may be accompanied by creating an entry in a port translation table, e.g., an entry mapping the dynamic port number to the original port number that it overwrote.

The reverse proxy 106 then forwards 216 the modified response to the browser 108 which receives 218 the modified response and processes it in the conventional manner. In particular, the browser 108 may process the response by invoking launching of the client 110 and invoking the client 110 to initiate a new connection to the application 104 using the different protocol as instructed by the response. This may include providing 220 the modified response, or one or more packets from the HTTP payload embodying the response, to the client 110.

In response to the instruction, modified response, or one or more packets of the modified response, the client 110 may transmit 222 a connection request to the dynamic port specified in the modified packet. The connection request may be a packet initiating a connection according to the new protocol, such as a SYN packet according to TCP protocol.

The reverse proxy 106 receives the connection request and verifies 224 that the connection request is for an authenticated connection using the ACL 224. For example, this may include verifying that there exists an ACL entry referencing the dynamic port number, IP address of the client device, or other attribute of the connection request. Connection requests that do not match an ACL entry are rejected.

In response to determining that the connection request matches the ACL entry, the reverse proxy may perform steps 226-228. At step 226, the reverse proxy 106 replaces the dynamic port number in the connection request with the original port number. As noted above, there may be a port translation table such that the original port number mapped to the dynamic port number in this table is obtained and used to overwrite the dynamic port number in the connection request to obtain a modified connection request.

The modified connection request is then forwarded 228 to the application 104. The application 104 receives 230 the modified connection request and processes it in order to initiate a connection with the client 110, e.g. participate in a three-way handshake per TCP or other connection initiation protocol for the non-HTTP protocol being used. For example, where the connection request was a packet initiating a connection according to a protocol, processing may include generating and transmitting 232 a response packet as part of initiating a connection (e.g., a SYN-ACK packet according to TCP protocol).

The reverse proxy 106 receives 234 the response packet and modifies 234 the response packet to replace the original port number with the dynamic port number. The original port number in the response packet may be the source port number, i.e. the port of the application 104 from which the response packet was transmitted 232. The modification of step 234 may be performed using the port translation table: detect a port number referenced in the original port numbers in the port translation table and, in response, replace that port number with the dynamic port number mapped to that port number in the port mapping table.

The packet as modified at step 234 may then be forwarded 236 to the client 110, which receives 238 and processes the modified packet, which may include performing steps of a connection initiation protocol (e.g., sending an ACK packet per TCP).

For example, the client may transmit 240 a packet to the reverse proxy, the packet being addressed to the dynamic port. The reverse proxy 106 then modifies the packet from step 240 to obtain a modified packet that has the dynamic port number replaced with the original port number. The reverse proxy then forwards 244 the modified packet from step 242 to the application 104, which receives 246 and processes the packet, such as by performing steps of a connection initiation protocol. In the case of TCP, upon receiving the ACK packet, the TCP connection is established and prepared for transmitting payload data within the TCP connection.

Subsequent packets exchanged between the client 110 and application 104 may be processed in the same manner as described above with respect to steps 222 to 246. In particular, translation between the dynamic and original port numbers for these packets may be performed as described with respect to steps 222 to 246.

Figure 3:
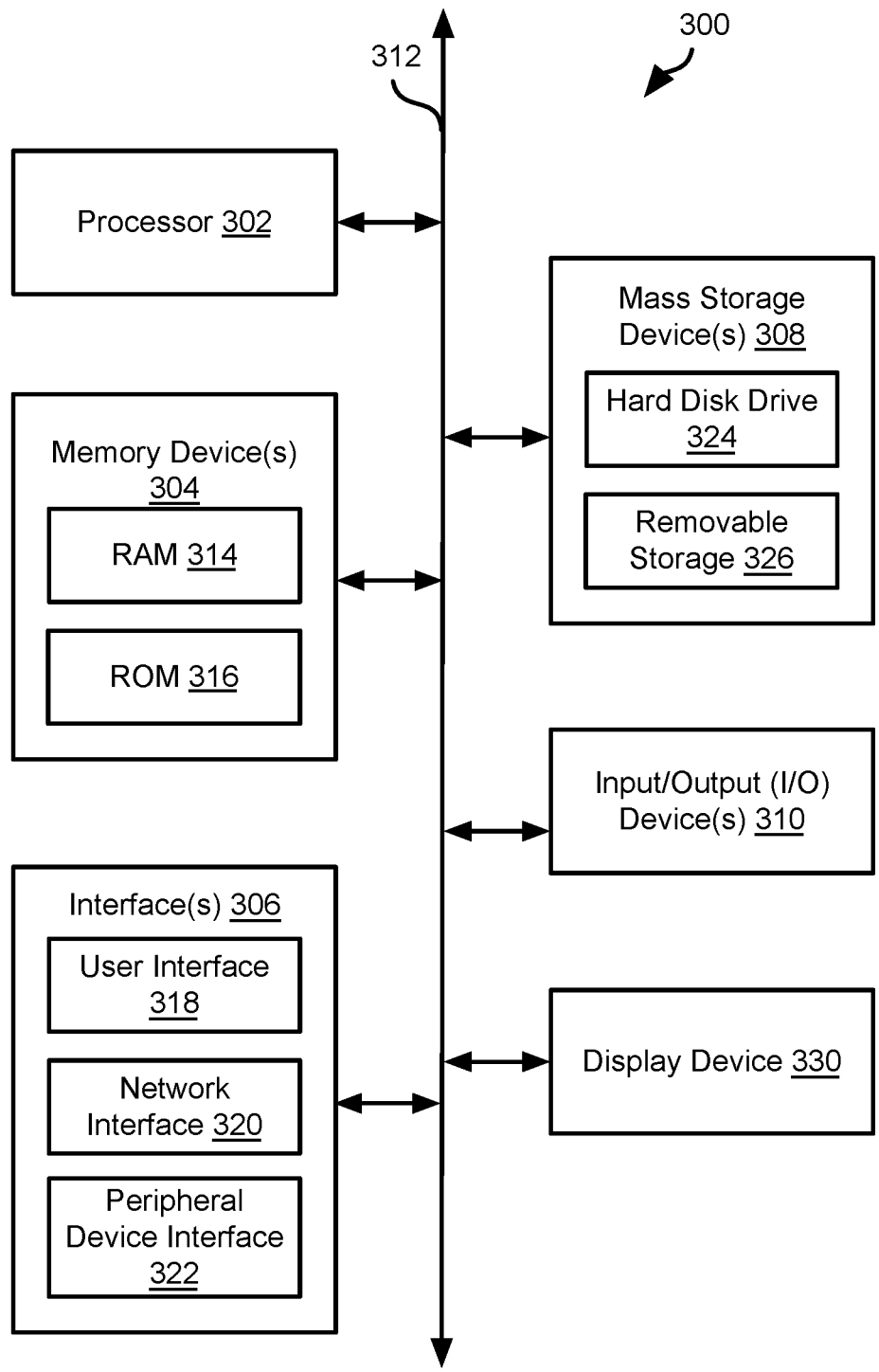
FIG. 3 is a schematic block diagram of a computing device that may be used to implement the systems and methods described herein.

FIG. 3 illustrates an example computing device 300 that may be used to implement a cloud computing platform or any other computing devices described above. In particular, components described above as being a computer or a computing device may have some or all of the attributes of the computing device 300 of FIG. 3. FIG. 3 is a block diagram illustrating an example computing device 300 which can be used to implement the systems and methods disclosed herein Computing device 300 includes one or more processor(s) 302, one or more memory device(s) 304, one or more interface(s) 306, one or more mass storage device(s) 308, one or more Input/Output (I/O) device(s) 310, and a display device 330 all of which are coupled to a bus 312. Processor(s) 302 include one or more processors or controllers that execute instructions stored in memory device(s) 304 and/or mass storage device(s) 308. Processor(s) 302 may also include various types of computer-readable media, such as cache memory.

Memory device(s) 304 include various computer-readable media, such as volatile memory (e.g., random access memory (RAM) 314) and/or nonvolatile memory (e.g., read-only memory (ROM) 316). Memory device(s) 304 may also include rewritable ROM, such as Flash memory.

Mass storage device(s) 308 include various computer readable media, such as magnetic tapes, magnetic disks, optical disks, solid-state memory (e.g., Flash memory), and so forth. As shown in FIG. 3, a particular mass storage device is a hard disk drive 324. Various drives may also be included in mass storage device(s) 308 to enable reading from and/or writing to the various computer readable media. Mass storage device(s) 308 include removable media 326 and/or non-removable media.

I/O device(s) 310 include various devices that allow data and/or other information to be input to or retrieved from computing device 300. Example I/O device(s) 310 include cursor control devices, keyboards, keypads, microphones, monitors or other display devices, speakers, printers, network interface cards, modems, lenses, CCDs or other image capture devices, and the like.

Display device 330 includes any type of device capable of displaying information to one or more users of computing device 300. Examples of display device 330 include a monitor, display terminal, video projection device, and the like.

Interface(s) 306 include various interfaces that allow computing device 300 to interact with other systems, devices, or computing environments. Example interface(s) 306 include any number of different network interfaces 320, such as interfaces to local area networks (LANs), wide area networks (WANs), wireless networks, and the Internet. Other interface(s) include user interface 318 and peripheral device interface 322. The interface(s) 306 may also include one or more user interface elements 318. The interface(s) 306 may also include one or more peripheral interfaces such as interfaces for printers, pointing devices (mice, track pad, etc.), keyboards, and the like.

Bus 312 allows processor(s) 302, memory device(s) 304, interface(s) 306, mass storage device(s) 308, and I/O device(s) 310 to communicate with one another, as well as other devices or components coupled to bus 312. Bus 312 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 300, and are executed by processor(s) 302. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A system comprising one or more processing devices and one or more memory devices coupled to the one or more processing devices, the one or more memory devices storing executable code that, when executed by the one or more processing devices, causes the one or more processing devices to:
   authenticate a user of a client computing device with respect to a first connection between the client computing device and an application, the first connection being established according to a first protocol;
   receive, acting as a reverse proxy, a response during the first connection, the response being sent by the application to the client computing device;
   if the response is an instruction to the client computing device to establish a second connection to the application according to a second protocol:
      allocate a dynamic port number;
      replace an original port number in the response with the dynamic port number to obtain a modified response;
      create an entry in an access control list (ACL), the entry including the dynamic port number and one or more attributes of the client computing device;
      forward the modified response to the client computing device;
      receive a connection request from the client computing device and addressed to the dynamic port number;
      evaluate the connection request with respect to the ACL;
      in response to the connection request being addressed to the dynamic port number and corresponding to the entry in the ACL, replace the dynamic port number with the original port number to obtain a modified connection request; and
      forward the modified connection request to the application.

2. The system of claim 1, wherein the modified response is sent to a browser executing on the client computing device and the connection request is received from a client application different from the browser and configured to interact with the application.

3. The system of claim 1, wherein the first protocol is hypertext transfer protocol and the second protocol is either transmission control protocol (TCP) or user datagram protocol (UDP).

4. The system of claim 1, wherein the one or more attributes of the client computing device include an internet protocol (IP) address of the client computing device.

5. The system of claim 1, wherein the executable code, when executed by the one or more processing devices, further causes the one or more processing devices to:
   determine that the response is the instruction to the client computing device to establish the second connection to the application according to the second protocol by evaluating a content type in a header of the response.

6. The system of claim 1, wherein the executable code, when executed by the one or more processing devices, further causes the one or more processing devices to:
   evaluate a content type in a header of the response;
   identify an entry in a signature database corresponding to the content type in the header of the response;
   obtain a rewrite rule from the entry in the signature database; and
   modify the response according to the rewrite rule to obtain the modified response.

7. The system of claim 1, wherein the application is executing in a cloud computing platform.

8. The system of claim 1, wherein the entry in the ACL has a time to live (TTL).

9. The system of claim 8, wherein the TTL expires before expiration of authentication of the first connection.

10. A method comprising:
    authenticating, by a computer system, a user of a client computing device with respect to a first connection between a client computing device and an application, the first connection being established according to a first protocol;
    receiving, by the computer system, a response during the first connection, the response being sent by the application to the client computing device;
    determining, by the computer system, that the response is an instruction to the client computing device to establish a second connection to the application according to a second protocol;
    in response to the determining that the response is the instruction to the client computing device to establish the second connection to the application according to the second protocol:
       allocating, by the computer system, a dynamic port number;
       replacing, by the computer system, an original port number in the response with the dynamic port number to obtain a modified response;
       creating, by the computer system, an entry in an access control list (ACL), the entry including the dynamic port number and one or more attributes of the client computing device;
       forwarding, by the computer system, the modified response to the client computing device;
       receiving, by the computer system, a connection request from the client computing device and addressed to the dynamic port number;
       evaluating, by the computer system, the connection request with respect to the ACL;
       in response to the connection request being addressed to the dynamic port number and corresponding to the entry in the ACL, replacing, by the computer system, the dynamic port number with the original port number to obtain a modified connection request; and
       forwarding, by the computer system, the modified connection request to the application.

11. The method of claim 10, further comprising sending the modified response to a browser executing on the client computing device and receiving the connection request from a client application different from the browser and configured to interact with the application.

12. The method of claim 10, wherein the first protocol is hypertext transfer protocol and the second protocol is either transmission control protocol (TCP) or user datagram protocol (UDP).

13. The method of claim 10, wherein the one or more attributes of the client computing device include an internet protocol (IP) address of the client computing device.

14. The method of claim 10, further comprising:
determining that the response is the instruction to the client computing device to establish the second connection to the application according to the second protocol by evaluating a content type in a header of the response.

15. The method of claim 10, further comprising:
evaluate a content type in a header of the response;
identify an entry in a signature database corresponding to the content type in the header of the response;
obtain a rewrite rule from the entry in the signature database; and
modify the response according to the rewrite rule to obtain the modified response.

16. The method of claim 10, wherein the application is executing in a cloud computing platform.

17. The method of claim 10, wherein the entry in the ACL has a time to live (TTL).

18. The method of claim 17, wherein the TTL expires before expiration of authentication of the first connection.

* * * * *